UNITED STATES PATENT OFFICE.

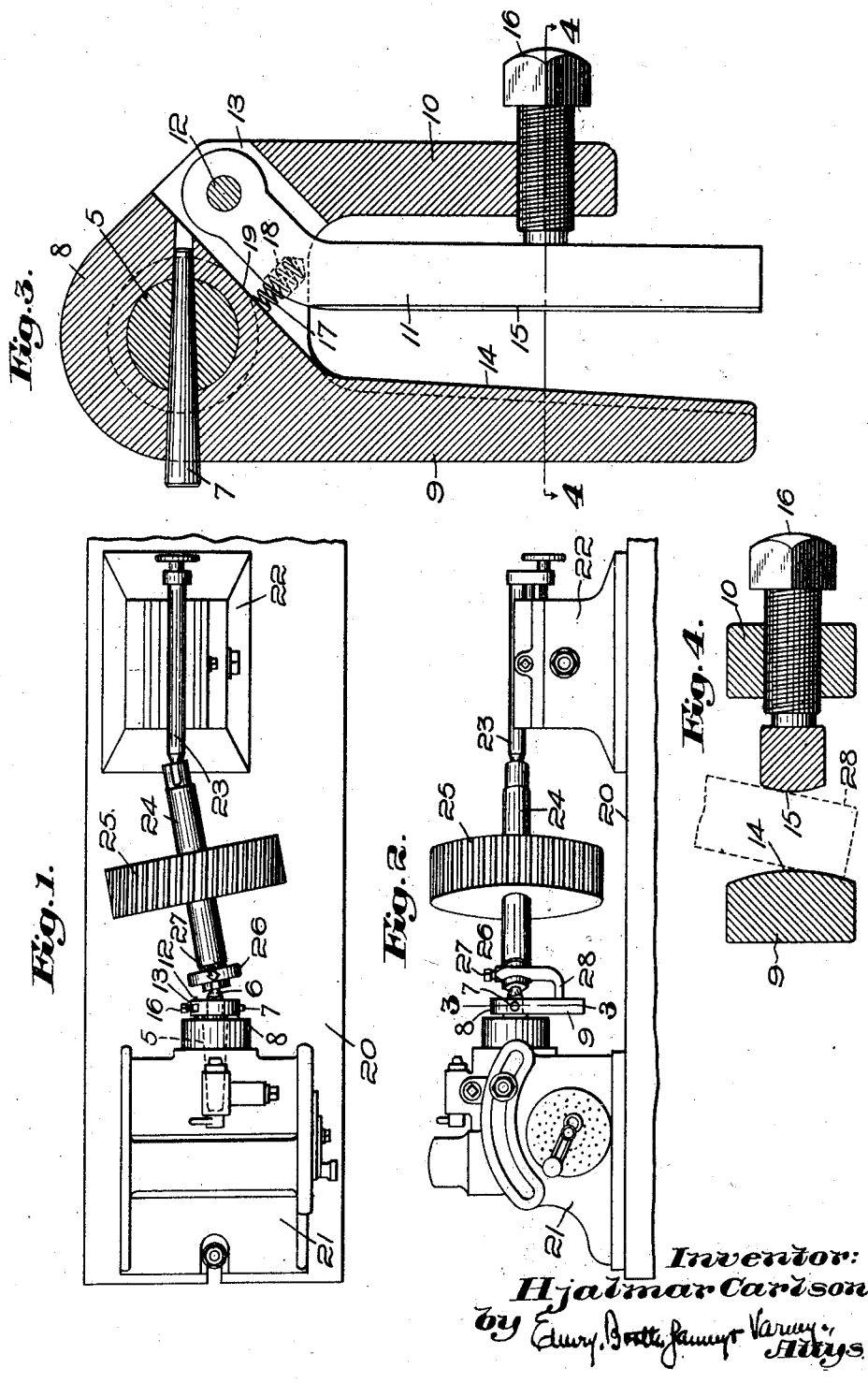

HJALMAR CARLSON, OF WOONSOCKET, RHODE ISLAND.

DOG DRIVER.

1,405,898.  Specification of Letters Patent.  Patented Feb. 7, 1922.

Application filed August 12, 1919. Serial No. 317,011.

*To all whom it may concern:*

Be it known that I, HJALMAR CARLSON, a citizen of the United States, and a resident of Woonsocket, in the county of Providence and State of Rhode Island, have invented an Improvement in Dog Drivers, of which the following description in connection with the accompanying drawings, is a specification, like characters on the drawing representing like parts.

This invention relates to dog-drivers for dividing or indexing heads of milling machines, and for analogous purposes in connection with other machine tools in situations requiring means for holding the tail of the dog which turns the work. My invention aims to provide a dog-driver having capacity to receive and clamp tails of dogs of various sizes, and to prevent free play of the dog with relation to the dog-driver about the axis of the work.

My invention will be best understood by reference to the following description, when taken in connection with the accompanying drawings of one illustrative embodiment thereof, while its scope will be more particularly pointed out in the appended claims.

In the drawings:

Fig. 1 is a plan of a portion of a milling machine equipped with a dog-driver exemplifying my invention;

Fig. 2 is a side elevation of the same;

Fig. 3 is a sectional view of the dog-driver on an enlarged scale on line 3—3 of Fig. 2; and Fig. 4 is a sectional view on line 4—4 of Fig. 3.

Referring to the drawings, and to the embodiment of my invention which I have selected for exemplification, I have shown a dog-driver comprising a usual tapered shank or plug 5, having a conical end 6 commonly called a center. Suitably secured to the shank 5, as by a tapered pin 7, is a collar 8 presenting a pair of fixed jaws 9 and 10. Another jaw 11 is mounted for movement toward and from the jaw 9, and to that end is herein mounted on a pivot 12. In the present example, the collar 8 is provided with a chamber 13, in which the pivot end of the jaw 9 is received.

The relatively movable jaws 9 and 11 present extended opposed surfaces 14 and 15, which are preferably convexly curved or rounded, as best shown in Fig. 4, the better to receive between them the tail of a dog which is inclined as indicated in dotted lines in Fig. 4. This relation of the parts is met with in practice in cases where the requirements of the work call for the axis of the dog being at an angle to the axis of the dog-driver, as more fully explained hereinafter.

Since the confronting surfaces 14 and 15 are extended in a generally radial direction, it is evident that the dog-driver will accommodate a very considerable range of sizes of dogs; that is to say, dogs whose radii from center to tail differ. By this means, therefore, I am enabled to provide a single dog-driver for a large number of sizes of dogs, thus obviating the use of a number of dog-drivers of different sizes, as heretofore used. Adjustment of the relatively movable jaws is herein effected by a set screw 16, having screw-threaded engagement with the fixed jaw 10 and engaging the movable jaw 15. This screw adjustably limits the movement of the jaws 9 and 11 from each other; that is to say, it provides a way of varying the distance between the confronting surfaces 14 and 15, and enables the tail of the dog to be clamped therebetween. I preferably provide suitable yielding means tending to spread the jaws 9 and 11 apart, and in the present example, I have shown for this purpose a helically coiled spring 17, having one end seated in a recess 18 in the jaw 11, and its other end against a suitable abutment 19 within the recess 13.

Referring now to Figs. 1 and 2, I have there shown an example of the uses to which the dog-driver may be put, and I have illustrated a portion of a milling machine having a bed 20 supporting a dividing or indexing head 21, and a tail-stock 22 sometimes called a foot-stock, the latter having a usual center 23. A mandrel 24, supported in a well-known manner by the centers 6 and 23, carries the work, herein a gear blank 25. A dog 26, secured to the mandrel 24 by a set-screw 27, is provided with a tail 28, which extends between the opposed surfaces 14 and 15 of the jaws 9 and 11.

In case it is desired to make a cut on the work at an angle to the axis thereof, this may be accomplished by setting the tail-stock so that the axes of the centers 6 and 23 are offset from each other, or parallel, as in Fig. 1. Under these circumstances, the tail 28 of the dog 26 is disposed at an oblique angle to the axis of the dog-driver. This condition is met by making the confronting surfaces 14 and 15 convexly curved, as before stated, and as clearly shown in Fig. 4. Adjustment of the jaws to clamp the tail of the dog is effected in an obvious manner by turning the set-screw 16 in the proper direction, it being evident that the spring 17 will at all times maintain the movable jaw 15 in contact with the end of the set-screw, thus making it unnecessary for the user to separate the jaws for the introduction of the dog tail.

Having thus described one embodiment of my invention, but without limiting myself thereto, what I claim and desire by Letters Patent to secure is:

1. In a dog-driver for index heads of milling machines, the combination of means for attachment of the dog-driver to the rotatable element of the index-head, a pair of relatively swinging jaws presenting extended opposed surfaces to receive between them the tails of dogs of various sizes, a pivot connecting said jaws and having its axis lengthwise of said axis of said means, and means adjustably to limit the swinging movement of one of said jaws from the other.

2. In a dog-driver, the combination of a pair of fixed jaws, a movable jaw therebetween, and means carried by one fixed jaw to adjust said movable jaw with reference to said fixed jaws.

3. In a dog-driver, the combination of a pair of fixed jaws, a movable jaw therebetween and pivoted to swing toward one of said fixed jaws, and means carried by one fixed jaw to adjust said movable jaw with reference to said fixed jaws.

4. In a dog-driver for index heads of milling machines, the combination of a shank adapted for attachment to the spindle of a machine tool, a collar secured to said shank and having a pair of fixed jaws, one provided with an opening, a movable jaw fulcrumed in said opening, and an adjusting screw carried by one of said fixed jaws and operating said movable jaw.

5. In a dog-driver for index heads of milling machines, the combination of a shank adapted for attachment to the spindle of a machine tool, a collar secured to said shank and having a pair of fixed jaws, one provided with an opening, a movable jaw fulcrumed in said opening, a spring tending to move said movable jaw toward one of said fixed jaws, and a set-screw carried by the other fixed jaw to adjust said movable jaw in opposition to said spring.

6. In a dog-driver for index heads of milling machines, the combination of means of attachment of the dog-driver to the rotatable element of the index-head, a pair of jaws presenting extended opposed surfaces to receive between them the tails of dogs of various sizes, a pivot presenting a journal connection between said jaws to permit them to swing freely toward and from each other within the full range of their adjustment, and means adjustably to limit such swinging to various angular distances within such range.

In testimony whereof, I have signed my name to this specification.

HJALMAR CARLSON.